March 10, 1964     E. J. SEIFERT     3,124,279
WATERING CAN
Filed July 14, 1958     2 Sheets-Sheet 1
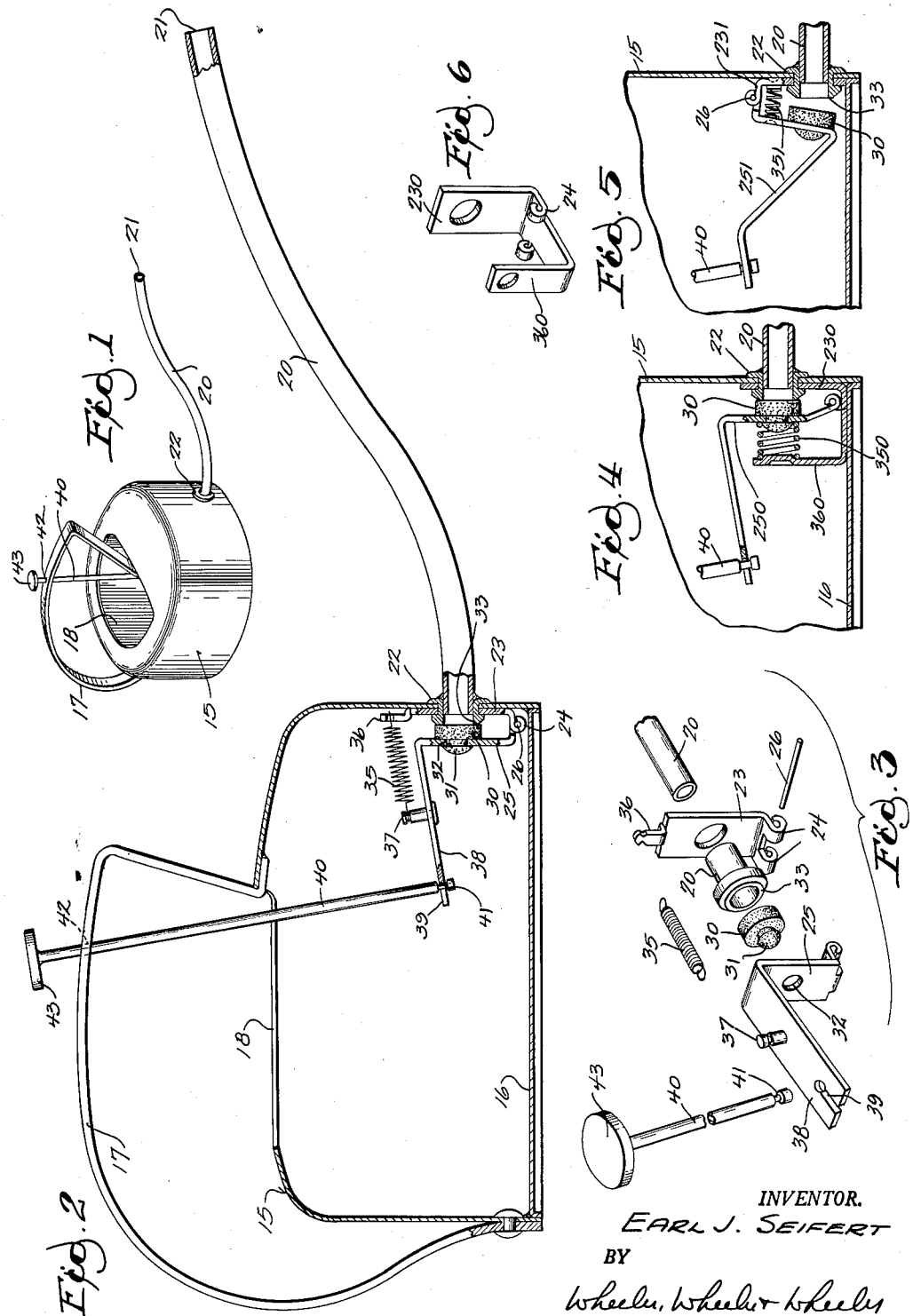
INVENTOR.
EARL J. SEIFERT
BY
Wheeler, Wheeler & Wheeler
ATTORNEYS

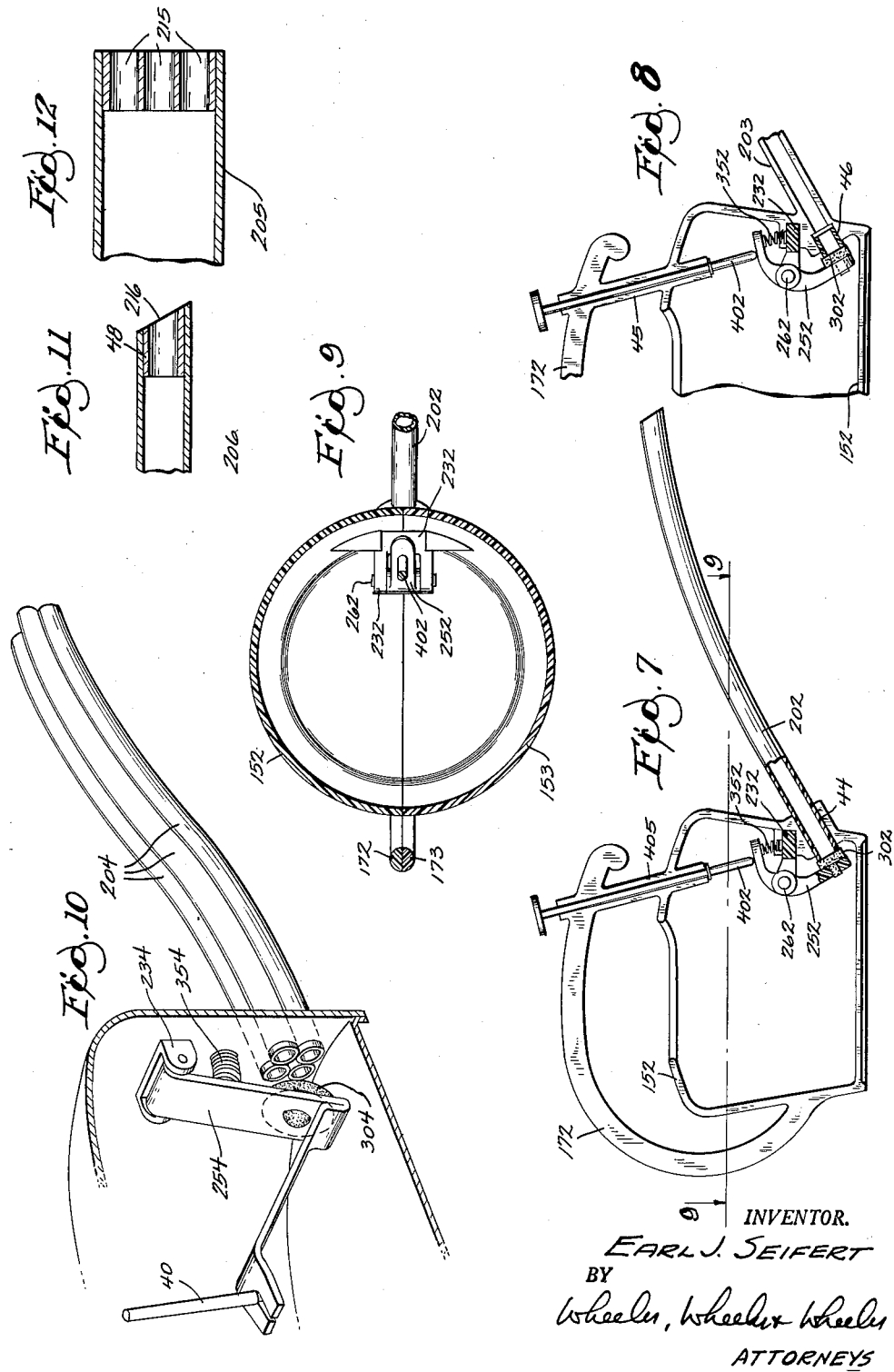

United States Patent Office 3,124,279
Patented Mar. 10, 1964

3,124,279
WATERING CAN
Earl J. Seifert, 3135 N. 49th St., Milwaukee, Wis.
Filed July 14, 1958, Ser. No. 748,439
3 Claims. (Cl. 222—471)

This invention relates to a watering can.

In its broader aspects, the invention is concerned with the discovery that the spout of a watering can will not drip if the terminal portion of the spout is made of wettable material and has a cross sectional area no greater than that at which the meniscus will be maintained. The precise cross section required will vary slightly according to whether the spout is circular in cross section and whether the water is soft or contains ingredients tending to reduce its surface tension. Tests of a substantial number of water samples indicate that the dimensions are critical and should, for water commonly used for house plants, be less than an area equivalent to a circle one-quarter of an inch in diameter, using a spout of copper, brass, rubber, steel or glass. If the end of the spout is beveled, this will somewhat increase the cross sectional area of the meniscus and the spout will have to have a smaller diameter than would be required if the spout were cut straight across. I have never found a spout or a natural water sample in which dripping would occur if the spout were not greater in diameter an a quarter of an inch, whereas dripping will almost invariably occur if the spout diameter is five-sixteenths of an inch.

Various specific embodiments of the invention herein disclosed have to do with convenient organizations of valves in association with spout receptacles, some of the valves being biased toward closed position and others biased toward open position and all of them desirably being operated by a push rod associated with the handle of the watering can. One specific embodiment of the invention involves the use of molded plastic to form two component parts of a receptacle assembled in a plane which includes the spout, whereby the spout is incorporated in the plastic receptacle when the two parts are united adhesively to complete the watering can.

Still another embodiment of the invention discloses an arrangement whereby the total flow of water can be increased by multiplying the number of spouts or the number of terminal spout apertures to the end that no terminal aperture will exceed the area across which a meniscus will form at the delivery surface of the water at the end of the spout.

In the drawings:

FIG. 1 is a view in perspective of a watering can embodying the invention.

FIG. 2 is a view in longitudinal section through a watering can embodying the invention, portions of the handle and the spout being shown in side elevation.

FIG. 3 is a view in perspective showing a spout and valve mounting and operating parts in mutually separated positions.

FIG. 4 is a fragmentary detail view showing in section a modified embodiment of the invention.

FIG. 5 is a view similar to FIG. 4 showing the parts in different relative positions.

FIG. 6 is a view in perspective illustrating the mounting fitting used in the device of FIGS. 4 and 5.

FIG. 7 is a view in side elevation of a molded component of a watering can, portions of the spout and valve operating lever and the valve and mounting for said lever being shown in section.

FIG. 8 is a view similar to FIG. 7 showing a slightly modified embodiment.

FIG. 9 is a view taken in section on the line 9—9 of FIG. 7.

FIG. 10 is a fragmentary detail view in perspective showing a multiple spout and single valve, portions of the receptacle or watering can being shown in section.

FIG. 11 is a fragmentary detail view in section through a modified spout terminal.

FIG. 12 is a fragmentary detail view in section through a modified embodiment of the spout terminal.

The watering can shown in FIGS. 1 to 5 comprises a body portion 15 having a separately prefabricated bottom 16 and a handle 17. The body has a filling opening at 18 and is equipped with a spout 20, the terminal end 21 of which may be beveled as suggested in FIG. 7 or square cut as suggested in FIG. 1 and FIG. 2. For ordinary types of natural water which would customarily be used in watering plants, the spout opening should be less than five-sixteenths of an inch in diameter if square cut or an equivalent area if beveled.

In the device of FIGS. 1 to 5, the tubular rivet 22 is fixed in the wall of the can body 15 to receive and support spout 20. In addition, the rivet holds a mounting bracket and provides a valve seat. In the device of FIGS. 2 and 3, the mounting bracket 23 is apertured to receive the tubular rivet 22 and has ears at 24 upon which the valve lever 25 is pivoted by pintle 26. The valve 30 has a headed shank at 31 forced through an aperture 32 in the lever 25 to be retained on the lever as shown in FIG. 2. It engages the annular seat 33 at the inner end of rivet 22 and is movable from such seat pivotally upon the pintle 26. A tension spring 35 is anchored to an arm 36 on the mounting bracket 23 and to a post 37 on lever 25 to bias the valve toward its seat.

The end portion 38 of the lever has a keyhole slot 39 into which may be forced the grooved terminal portion of the push rod 40 which actuates the valve to and from its seat. The groove 41 is loosely engaged in the keyhole slot providing sufficient flexibility to accommodate some relative angular movement between the lever arm 38 and push rod 40. The latter is guided in an aperture 42 in handle 17 and is provided with a push button 43 at its upper end, where it is located conveniently to the hand of an operator who is grasping the handle 17.

The spout 20 may be soldered into the tubular rivet 22 but the rivet itself provides a watertight connection to the can in addition to holding the bracket 23 in position. Thus the assembly of the spout and the valve supporting and operating parts is extremely simple.

In the construction shown in FIG. 4, the lever 250 is somewhat different in form from the lever 25 but is operated substantially the same way by the push rod 40. The bracket 230 has an arm 360 which provides a seat for the compression spring 350 which replaces the tension spring of FIG. 3.

In the construction shown in FIG. 5, a modified bracket 231 has its pintle 26 above rather than below the valve seat 33 for the support of the further modified lever 251. In this instance, the arrangement is such that the compression spring 351 interposed between the bracket 231 and the lever 251 biases the valve 30 to a normally open position as shown in FIG. 5. In this arrangement the water will flow from the spout as soon as the can is tilted and will cease flowing instantly when the valve is seated by pressure on the push button 43 at the upper end of rod 40.

In the constructions shown in FIGS. 7, 8 and 9, allochiral can parts 152 and 153 and corresponding handle parts 172 and 173 are molded, each in one piece, as of plastic material. The component parts are cemented together upon a central plane as shown in FIG. 9. They provide complementary seats 44 for the spout 202 and the bracket 232, whereby these parts are anchored in place when the can halves 152, 153 are cemented together. In this instance, the valve seat is provided by the end of the spout itself and the valve 302 moves to and from the seat upon lever 252 pivoted on pintle 262 to the bracket 232. A spring 352 interposed between the lever and bracket biases the valve toward its seat. The valve can be displaced from the seat to permit flow to the spout when subjected to the pressure of the push rod 402 for which the component halves of the can provide complementary guide channels at 45.

The construction of FIG. 8 differs in that the spout 203 is likewise made in halves integrally with the allochiral parts of the can to be completed when the said parts are cemented or otherwise fused together. To provide a good seat for the valve 302, an insert sleeve 46 is provided.

Since the cross sectional area of the spout is limited critically to prevent drip, it will be evident that flow through such a spout is limited to the amount of water which will flow through the restricted terminal portion of the spout under the available head. If more flow is desired, it is necessary to provide multiple terminal spout openings, each of which, if drip is to be prevented, must be limited in area to be less than the area of a circle five-sixteenths of an inch in diameter. This may be done either by making the entire spout in multiple as shown at 204 in FIG. 10 (in which case a single valve 304 may control all of the spouts concurrently) or it may be done by providing a single large spout 205 having multiple openings 215 at its terminal end, each being less than five-sixteenths of an inch in diameter.

If the spout is quite long and a great deal of side wall friction occurs, the friction can be reduced by making the spout 206 of considerably greater diameter than one-quarter of an inch in cross section throughout most of its length, and limiting the area of its terminal portion by means of an insert 48. The terminal opening 216 has an area less than a circle five-sixteenths of an inch in diameter.

As an incidental feature, FIG. 10 shows a further modified type of bracket at 234 and lever 254 for the valve 304, the bracket being mounted directly on the can wall and the compression spring 354 seating directly against such wall and tending, in this instance, to bias the valve toward its open position.

It will be understood that in all of the embodiments herein disclosed, the preferred dripless spout arrangement is one in which, regardless of the size or number of spouts, each terminal opening has a cross sectional area less than that of a circle of five-sixteenths of an inch in diameter. One-quarter inch is the preferred cross sectional diameter.

It is broadly immaterial whether the valve is biased to or from its seat or whether it is opened or closed by manual pressure. In the various preferred constructions, the mounting of the spout, the valve lever bracket, the valve seat and valve is desirably accomplished in one or two very simple operations, thus facilitating manufacture.

I claim:

1. A watering can having a spout with a terminal aperture sufficiently small to maintain a meniscus when flow of water through such spout is arrested, said can having valve means remote from the terminal aperture for arresting flow, the means for arresting flow comprising a valve seat adjacent the wall of the can, a valve movable in directions to and from the seat, means biasing the valve for movement from the seat and means for manually moving the valve toward the seat.

2. The device of claim 1 in which the can has an aperture from which the spout leads, a mounting means engaging the can about said aperture and with which the spout is connected, a lever pivoted to the mounting means upon which the valve is mounted, said mounting means providing said seat for said valve.

3. A watering can having a spout with a terminal aperture sufficiently small to maintain a meniscus when flow of water through said spout is arrested, said can having a wall, a valve seat adjacent the wall, a valve movable to and from the seat, means biasing the valve for movement in one direction, means for manually moving the valve in the opposite direction, the can having an aperture from which the spout leads, a mounting means engaging the can about said aperture and with which the spout is connected, a lever pivoted to the mounting means upon which the valve is mounted, said mounting means providing said seat for said valve, said biasing means comprising a spring terminally engaging the mounting means and the lever.

References Cited in the file of this patent

UNITED STATES PATENTS

| | | |
|---|---|---|
| 120,336 | Smith | Oct. 24, 1871 |
| 266,736 | Warwick | Oct. 31, 1882 |
| 476,795 | Hatfield | June 14, 1892 |
| 658,250 | Erfmann | Sept. 18, 1900 |
| 1,238,118 | Edmunds | Aug. 28, 1917 |
| 2,076,215 | Woelfer | Apr. 6, 1937 |
| 2,424,045 | Millstein | July 15, 1947 |
| 2,697,446 | Harrington | Dec. 21, 1954 |
| 2,754,178 | Mack | July 10, 1956 |
| 2,822,965 | Smith | Feb. 11, 1958 |
| 2,886,218 | Marcus | May 12, 1959 |

FOREIGN PATENTS

| | | |
|---|---|---|
| 4,767 | Switzerland | Mar. 26, 1892 |